June 4, 1968 R. L. TANNER ETAL 3,387,215
APPARATUS FOR MEASURING THE RF NOISE PRODUCED BY
PASSIVE STATIC DISCHARGERS FOR AIRCRAFT
Filed July 28, 1965 5 Sheets-Sheet 1
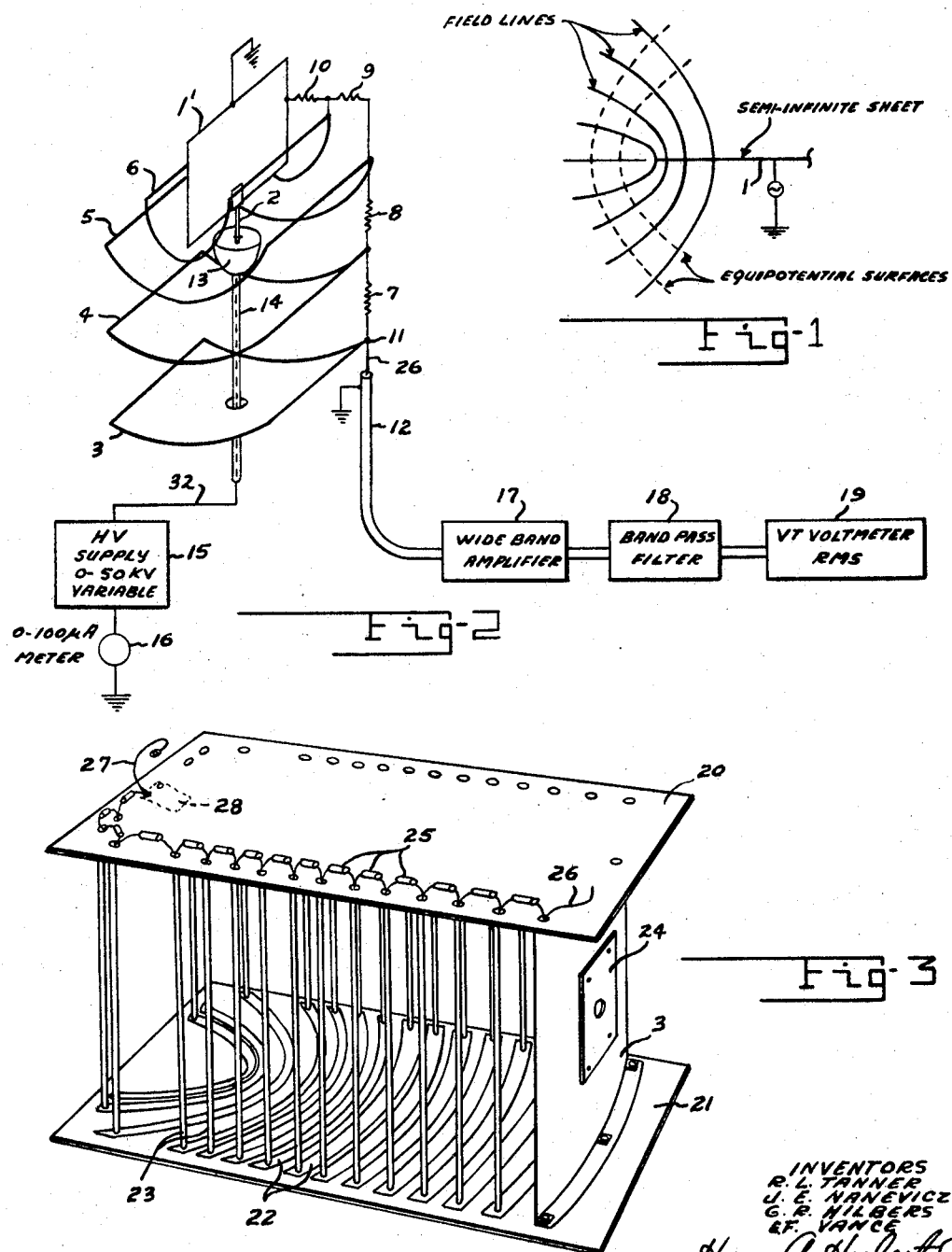
INVENTORS
R. L. TANNER
J. E. NANEVICZ
G. R. HILBERS
F. VANCE
BY Harry A. Herbert Jr.
ATTORNEY
James J. Shannon
AGENT

| CURVE LAYOUT SCHEDULE | | | | | |
|---|---|---|---|---|---|
| CURVE # | ℓ | A-A' | B-B' | C-C' | D-D' |
| 1 | -0.36 | +0.526 | +5.89 | — | — |
| 2 | -1.00 | -0.438 | +1.25 | +4.06 | +8.00 |
| 3 | -1.96 | -1.67 | -0.814 | +0.62 | +2.63 |
| 4 | -3.24 | -3.07 | -2.55 | -1.68 | -0.46 |
| 5 | -4.00 | -3.86 | -3.44 | -2.73 | -1.75 |
| 6 | -4.84 | -4.72 | -4.37 | -3.79 | -2.98 |
| 7 | -5.76 | -5.66 | -5.37 | -4.88 | -4.20 |
| 8 | -6.76 | -6.68 | -6.43 | -6.01 | -5.43 |
| 9 | -7.84 | -7.77 | -7.55 | -7.19 | -6.69 |
| 10 | -9.00 | -8.94 | -8.75 | -8.44 | -8.00 |
| 11 | -10.25 | -10.19 | -10.04 | -9.76 | -9.37 |
| 12 | -11.57 | -11.52 | -11.38 | -11.13 | -10.79 |
| 13 | -12.97 | -12.93 | -12.80 | -12.58 | -12.28 |
| 14 | -14.45 | -14.41 | -14.30 | -14.10 | -13.83 |
| 15 | -16.00 | -15.96 | -15.86 | -15.68 | -15.44 |

INVENTORS
R.L. TANNER
J.E. NANEVICZ
G.R. HILBERS
E.F. VANCE

BY Harry A. Herbert Jr
ATTORNEY

James S. Shannon
AGENT

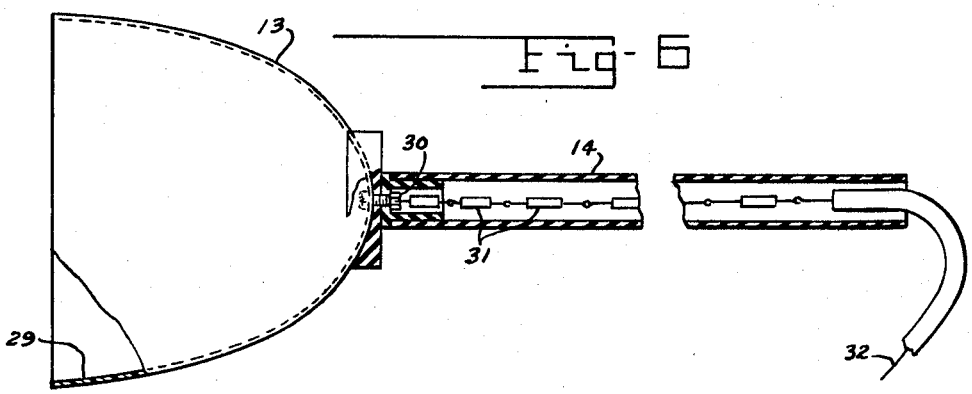
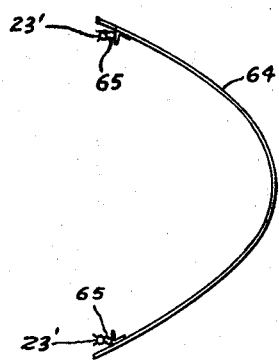
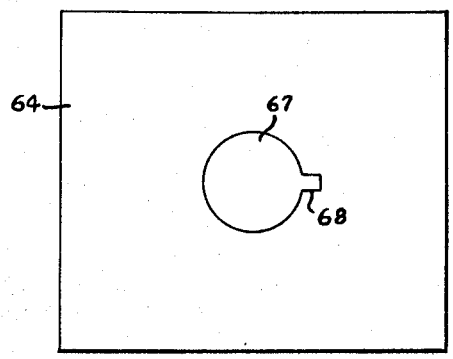
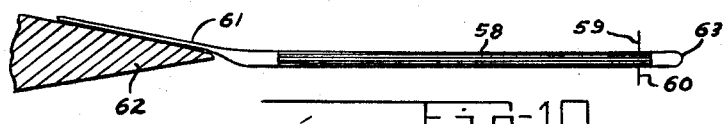
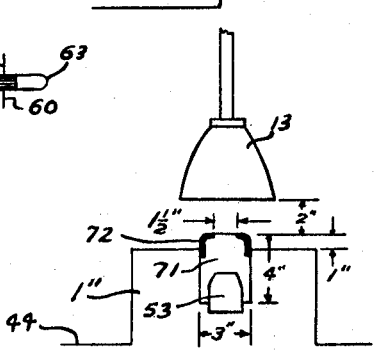
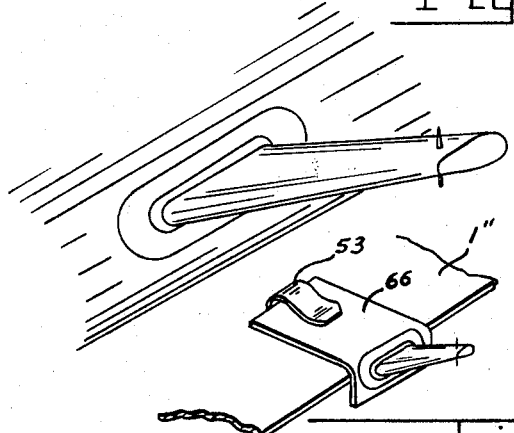
INVENTORS
R. L. TANNER
J. E. NANEVICZ
G. R. HILBERS
E. F. VANCE

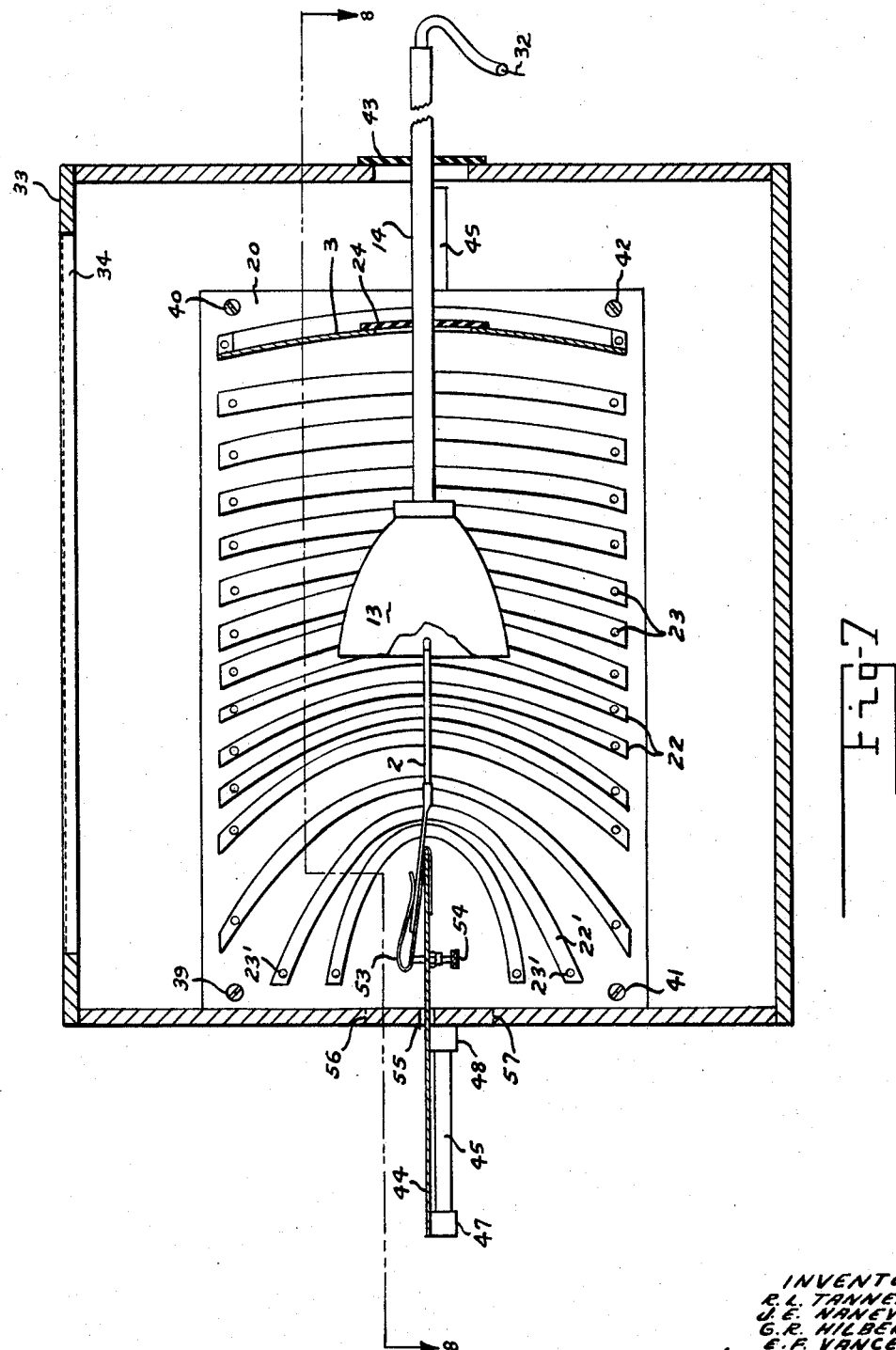

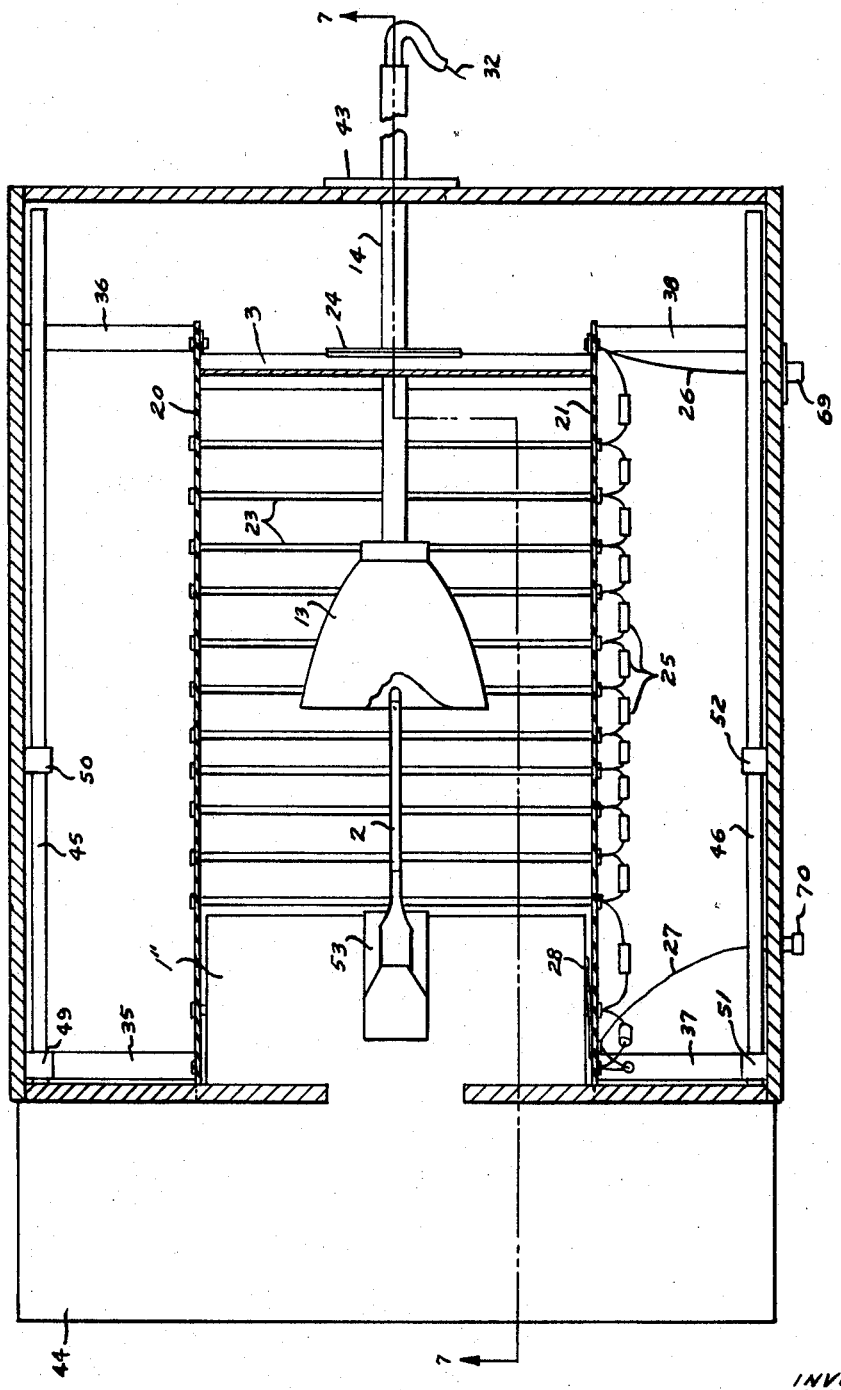

3,387,215
APPARATUS FOR MEASURING THE RF NOISE PRODUCED BY PASSIVE STATIC DISCHARGERS FOR AIRCRAFT
Robert L. Tanner, Portola Valley, and Joseph E. Nanevicz, George R. Hilbers, and Edward F. Vance, Palo Alto, Calif., assignors to the United States of America as represented by the Secretary of the Air Force
Filed July 28, 1965, Ser. No. 475,614
3 Claims. (Cl. 325—363)

Whenever an aircraft flies through precipitation containing ice crystals its electrical potential increases due to triboelectric charging. In this process the ice particles acquire a positive charge, leaving the aircraft with a negative charge. This charge increases until the corona threshold potential is exceeded and until finally the corona discharge current from the aircraft equals the rate of charge. Since corona discharge consists of a series of extremely short pulses it generates noise well into the RF (radio frequency) spectrum which is coupled into the aircraft receiving antennas, generating interference that is frequently severe enough to completely disable radio communication.

Various devices have been designed to control this unavoidable discharging of the aircraft and to force it to occur under conditions less conducive to the production of noise in the receiver. The design of passive devices for this purpose is generally directed toward (1) reducing the noise generated by the discharge and (2) reducing the coupling between the discharge and the receiving antenna. The noise generated may be reduced by causing the discharge to occur from points of small radius since the amplitude of the discharge pulses, and therefore the amplitude of the noise, decreases as the radius decreases. The coupling between the discharge and the antenna is proportional to the strength of the electric field, called the reciprocal field, that would exist in the direction of the discharge if a voltage were applied to the antenna terminals. The familiar nylon wick discharger, which is made up of a large number of fine nylon fibers rendered slightly conductive by an impregnation of the wick with a resistive material, reduces noise by causing the discharge to take place from many points of small radius, namely the ends of the nylon fibers, at a place several inches aft of the airfoil trailing edge where the strength of the reciprocal field is considerably less than at the trailing edge. Another type of discharger, known as the ortho-decoupled type, in addition to having the discharge occur from sharp points located at a position where the reciprocal field is weak, also forces the discharge to occur in a direction at right angles to the lines of the reciprocal field whereby the component of the field in the discharge direction is reduced to a minimum to further decouple the discharge from the antenna.

It is the purpose of this invention to provide a tester for measuring the RF noise produced by static dischargers of which the above described types are examples. For measurements that will be directly related to the RF noise coupled into the aircraft antenna system when the discharger is installed on an aircraft, the tester must meet three basic requirements, namely: (1) the reciprocal field in the tester must conform to the reciprocal field at the discharger when installed on the aircraft, (2) the DC field inducing the corona discharge in the tester must conform to the DC field at the discharger when installed on the aircraft, and (3) the noise measured in the tester must be restricted to the response frequency range of the receiver.

Briefly stated, the RF field configuration in the tester is obtained by modeling the section of the aircraft where the dischargers are installed, such as the airfoil trailing edge or tip cap, and placing a conducting sheet, formed to the contour of an equipotential surface about the aircraft, at the location of the equipotential surface relative to the modeled aircraft section. Guard rings, also formed to the shape of equipotential surfaces, are used between the modeled aircraft section and the conducting sheet to reduce fringing effects. A resistance voltage divider is used to maintain the guard rings at the proper RF potential relative to the modeled section and the conducting sheet.

The modeled section, guard rings and conducting sheet are at DC ground potential. The DC field required to induce corona discharges from the discharger is produced by a separate electrode placed near the end of the discharger. This electrode is shaped so that the DC field about the discharger is similar to the DC field about a discharger on a charged aircraft. The electrode is made of a dielectric material coated with high resistance material and is connected through a high resistance lead to an external high voltage DC source so that the electrode and connecting lead do not appreciably perturb the RF field in the tester.

To make a noise measurement, the discharger is mounted on the modeled aircraft section and the DC electrode adjusted to the proper position relative to the discharger trailing end. High voltage is applied to the electrode as necessary to induce corona from the discharger. The RF voltage developed between the modeled section and the conducting sheet in the tester is amplified in a wide-band amplifier, filtered through a bandpass filter corresponding to the frequency range of the aircraft receiver and measured with a vacuum tube voltmeter of the type giving a true RMS (root mean square) reading. The meter reading is directly related to the noise that would be produced by the discharger in the aircraft receiver.

The invention will be described in more detail with reference to the specific embodiment thereof shown in the accompanying drawings in which FIG. 1 illustrates the RF field in the vicinity of an airfoil trailing edge;

FIG. 2 illustrates the complete tester schematically;

FIG. 3 shows a manner of forming the guard ring structure;

Figures 4, 5:
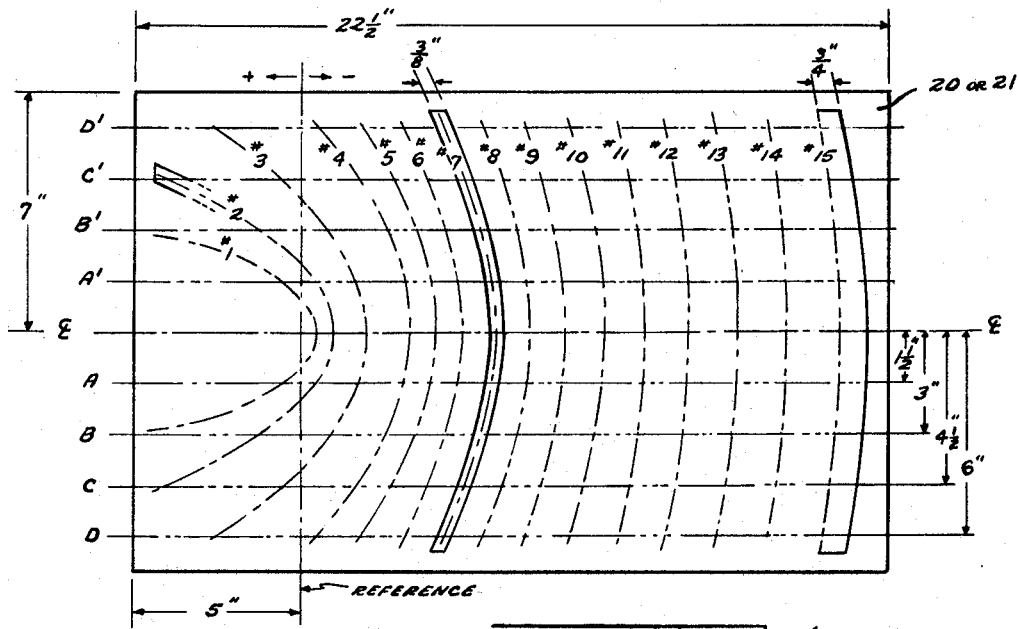

FIGS. 4 and 5 give data for constructing the parabolic portions of the guard rings;

FIG. 6 illustrates the construction of the high voltage DC electrode;

FIGS. 7 and 8 show elevation and plan sections respectively of the assembled tester;

FIG. 9 illustrates a type A ortho-decoupled discharger;

FIG. 10 illustrates a type B ortho-decoupled discharger;

FIGS. 11 and 12 provide end and front views of an airfoil tip simulator for use when testing type B dischargers;

FIG. 13 illustrates a test adapter for type B dischargers; and

FIG. 14 shows a method of conducting a simulated airfoil trailing edge discharge test.

Of greatest concern in constructing a device to measure the noise produced by a discharger is the geometry of the RF field in the vicinity of the discharge. The short circuit noise current, $I_2(\omega)$, at the terminals of an aircraft receiving antenna or at the ouput terminals of a discharger tester is given by $$I_2(\omega) = \frac{1}{V_1(\omega)} \int T_2 E_1(x, \omega) \cdot J_2(x, \omega) dv \qquad (1)$$

where $J_2$ is the discharge current density at a point in the region $T_2$ and $E_1$ is the field produced at the same point in $T_2$ when a voltage $V_1(\omega)$ is applied to the terminals.

Therefore, any deviation of $E_1$ in the tester from the corresponding field about an airfoil on an aircraft will produce a deviation in the measured noise current $I_2(\omega)$. Similarly, deviations in the DC field that causes the discharge current density $J_2$ will produce deviations in $J_2$ and, therefore, in $I_2(\omega)$. Since the portion of the discharge region active in producing noise is very near the discharger, the DC field in this region is usually determined more by the discharger than by auxiliary electrodes used to induce corona. On the other hand, because the discharger is generally made of high resistance material and is therefore transparent at radio frequencies, the RF field geometry in the tester will be little affected by the shape of the discharger in the vicinity of the discharge. Thus the design of a tester to measure noise may be considered as two almost separate problems: (1) that of producing an RF field geometry similar to that which exists about an airfoil and (2) that of providing a DC field to induce corona.

Considering first the problem of reproducing the geometry of the RF field about an airfoil equation 1 may be applied. In this case, let $V'(\omega)$ be applied to the terminals of the antenna on the aircraft. Then a field $E_1'$ will be produced about the aircraft, and in particular in the region about the airfoil where the discharger is located. If a discharger were located on the airfoil and a discharge current $J_2'$ were caused to flow, a short circuit noise current $I_2'(\omega)$ would flow through the antenna terminals. It is the field $E_1'$, therefore, that should be simulated in the tester. The field in the vicinity of an airfoil trailing edge is similar to the field about an energized semi-infinite plane conductor 1 illustrated in FIG. 1. This field geometry can be reproduced on a finite scale by replacing one of the equipotential surfaces with a conducting parabolic sheet and using guard rings to reduce fringing of the field at the ends of the plane sheet and the parabolic sheet as illustrated in FIG. 2, where the complete tester is shown schematically.

Referring to FIG. 2, the plane conductive sheet 1' models the trailing edge of an airfoil and has a discharger 2 to be tested mounted thereon. As stated above, the required RF field geometry is reproduced by a parabolic conductive sheet 3 and parabolic conductive guard rings 4, 5 and 6 corresponding to the equipotential surfaces of the field. The proper relative RF potentials between elements 3, 4, 5, 6 and 1' is established by a potential divider composed of resistors 7, 8, 9 and 10. The RF noise output is developed between an output terminal 11 on conductive sheet 3 and element 1' which is at ground potential. This output is applied to a shielded cable 12 by lead 26.

Corona is induced from the sample 2 by means of an electrode 13 in the form of a highly resistive paraboloid near the end of the discharger. This electrode may be formed, as shown later, of a thin dielectric material coated with a high resistance conductive paint on the inner surface. The conductive paint provides a boundary to terminate the DC field but is of sufficiently high resistance that it is transparent to RF fields at the frequencies of interest. Thus the presence of the electrode does not alter the noise coupling in the tester. The support 14 for the electrode, which also provides axial adjustment, is electrically a high resistance lead and likewise is transparent to the RF field so that it does not influence the noise coupling in the tester. Positive DC voltage is supplied to the electrode 13 by connecting it through lead 14 to the positive terminal of high voltage source 15, the negative terminal of which is connected through microammeter 16 to ground, so that negative point corona will be induced at the discharger 2. The preferred axial position of the electrode is such that the discharging region of the discharger is in the plane of the mouth of the paraboloid, substantially as illustrated in FIG. 2. Because of the parabolic shape of electrode 13, the DC field structure about the discharger is very nearly the same as that to be found around a discharger installed on an aircraft.

It would also be possible to induce negative point corona from the sample by applying a negative voltage to sheet 1' or a positive voltage to parabolic sheet 3. In either case, however, very high voltages would be required causing insulation problems and necessitating special resistors for the guard ring voltage divider. Further, the application of a negative voltage to element 1' would create a hazard since the sample is attached to and removed from this element by the operator. On the other hand, the application of positive voltage to element 3 introduces the additional problem of isolating the RF noise voltage from the DC voltage. Therefore, the above described method using electrode 13 is to be preferred. A further advantage of this method is the relatively low voltage required to induce corona discharge, this voltage being of the order of tens of kilovolts because of the closeness of electrode 13 to the discharger under test.

The RF noise produced by the discharger is coupled through shielded cable 12 to a wide band amplifier 17. That portion of the amplifier output lying in the frequency range of interest, i.e. the frequency range of the aircraft receivers, is selected by bandpass filter 18 and its RMS value measured by vacuum tube voltmeter 19, the voltmeter reading being directly related to the noise generated.

A suitable method of fabricating the guard ring structure and the parabolic conductor 3 is illustrated in FIG. 3. The similar side plates 20 and 21 are made of phenolic boards copper-clad on one side, with the copper etched away to leave the parabolic portions 22 of the guard rings. The guard rings are completed by conductive rods 23 extending between matching pairs of the parabolic conductors 22 on the two end plates. The parabolic conductor 3 is made of a sheet of aluminum or other suitable conductive material shaped to conform to the equipotential surface at that point and extending between the two side plates. An insulator of Teflon, for example, provides for the passage of the supporting tube 14 for electrode 13. A potential divider consisting of series connected resistors 25 corresponds to the potential divider 7-8-9-10 of FIG. 1 and extends from electrode 3 and RF noise output lead 26 to grounding lead 27 and spring contact 28 which serves to ground the conductive sheet which simulates the airfoil trailing edge and supports the discharger under test, as will be seen later.

The center lines of the conductors 22 may be located on plates 20 and 21 in accordance with the data in FIGS. 4 and 5. Curve No. 15 in FIG. 4 represents the curvature of the front surface of electrode 3.

The construction of the high voltage DC electrode 13, its support 14 and its high resistance lead are illustrated in FIG. 6. This electrode is a paraboloid formed of a thin dielectric material, such as an acrylic resin, and is coated with a high resistance conductive paint on its inside surface 29. The conductive paint provides a boundary to terminate the DC field. The paint resistance, however, is sufficiently high that it is transparent to RF fields at the frequencies of interest. Thus, as stated earlier, the presence of the parabolic electrode does not alter the noise coupling in the tester. In painting the electrode, care should be exercised to apply the paint in a smooth, even coat. The resistance of the paint may be checked by pressing the mouth of the paraboloid against a sheet of aluminum foil laid on a rubber sheet and measuring the resistance between the foil and the terminal 30 at the apex of the paraboloid. The resistance should not be less than 2.0 megohms.

The electrode 13 is supported within the tester, as will be seen later, by a tube 14 of a suitable dielectric such as Lucite. A high resistance made up of series connected resistors 31 passes from apex electrode 30 through the tube and via high voltage lead 32 to the positive terminal of high voltage DC supply 15 (FIG. 1). Like the coated paraboloid 13, the high resistance lead is transparent to the RF fields in the tester and does not alter the noise coupling.

Two sectional views of the assembled tester are shown in FIGS. 7 and 8. The tester is housed in an enclosure that also serves as an RF shield. For this purpose the enclosure may be made of metal or, if constructed of an insulating material such as plywood, it may be covered with copper or other conductive screen to provide shielding. The top 33, as seen in FIG. 7, may be hinged for access to the interior of the tester and may have an opening 34 for inspecting the interior, which opening should be covered with conductive screen. The guard ring structure and electrode 3 are supported within the enclosure by stand-off insulators, such as 35, 36, 37 and 38 seen in FIG. 8, to which side plates 20 and 21 are attached as by screws 39, 40, 41 and 42 seen in FIG. 7.

Tube 14 which, as already explained, supports DC high voltage electrode 13 is in turn supported in the tester by insulator 24 in electrode 3 and insulator 43 in the enclosure wall. The insulators have a sliding fit to tube 14 to permit axial adjustment of the position of electrode 13 relative to the end of the discharger 2 under test.

A T-shaped conductive plate 44 made, for example, of aluminum has steel guide rods 45 and 46 attached to its under side as by mounting blocks 47 and 48 made of a suitable metal such as brass. These rods extend through holes in the front wall of the enclosure and are supported inside the enclosure by brass pillow boxes 49, 50, 51 and 52 attached to the enclosure side walls. The rods pass through holes in the pillow boxes with a sliding fit so that the plate 44 may be completely withdrawn from the enclosure for attaching and removing static discharges for testing.

The portion 1″ corresponds to plate 1′ in FIG. 1 and serves to simulate the trailing edge of an airfoil in the tester. The discharger 2 to be tested is mounted at the edge of portion 1″ of plate 44 by means of a discharger clamp 53, the angle of which may be adjusted by screw 54. A suitable material for this clamp is beryllium copper. A horizontal slot 55 is provided in the front wall of the enclosure to permit the portion 1″ of plate 44 to enter. For a distance on either side of the center of plate 44 the height of the slot is increased both above and below the plate, as indicated by dotted lines 56 and 57, to permit the passage of clamp 53 and screw 54.

RF noise output lead 26 extends from the parabolic conductor 3 to a suitable connector 69 provided for attachment of the noise output cable 12 (FIG. 2). A potential divider, composed of series resistors 25 extending from conductor 3 to spring contact 28 and ground lead 27, provide a potential divider for establishing the proper RF potentials at the guard rings, as already explained. Ground lead 27 may be brought to an outside ground terminal 70 if desired. Spring contact 28 insures a good ground connection to plate 44 when the plate is in its test position.

The discharger 2 shown in test position in FIGS. 7 and 8 is known as an ortho-decoupled type A and is illustrated in more detail in FIG. 9. This type is intended primarily for use at the trailing edges of air foils and its operating principles have already been briefly discussed. Referring to FIG. 9 a type A discharger consists of a nylon rod 58 about 0.250 inch in diameter and about seven inches long. The rod is coated with a pliable high resistance paint and provided with sharp tungsten needle points 59 and 60 from which the discharge occurs. The rod is mounted in a conductive base 61 suitable for attachment to the trailing edge of an airfoil 62. The aft tip 63 of the rod is hemispherically rounded and coated with a dielectric to prevent corona from occurring at the tip.

A second type of ortho-decoupled discharger known as the type B is illustrated in FIG. 10. This type is intended primarily for mounting on airfoil tips. Electrically it is no different from the type A discharger but its mechanical structure is designed to withstand the high turbulence at the airfoil tips. In order to test type B dischargers the airfoil tip simulator, shown in different views in FIGS. 11 and 12, is installed in the tester. The simulator consists of a parabolic conductive sheet 64, of aluminum for example, which conforms to the shape of the second parabolic conductor 22′ in the guard ring structure (FIG. 7). The simulator is held in place by clips 65 which snap over rods 23′. An adapter 66 permits the discharger to be held by clamp 53, as seen in FIG. 13. With the type B discharger thus mounted on plate 44, the plate is pushed into the tester until the discharger passes through opening 67 in the tip simulator 64 and its base is flush with the simulator surface. A notch 68 for passage of the tip of the slanted discharger permits a smaller opening 67.

Discharger tests are conducted with the test arrangement shown in FIG. 2. The noise figure for the test sample is the voltmeter 19 reading for a predetermined discharge current, for instance 50 microamperes. This condition is established by adjusting the voltage of DC high voltage supply 15 until meter 16 reads the desired discharge current value. In some cases the noise measured with the discharger in corona discharge may be only slightly higher than the residual noise of the system. In these cases, the following equation may be used to determine the true value of the noise generated by the discharger:

$$V_d^2 = V_m^2 - V_r^2 \qquad (2)$$

where $V_d$ = RMS noise generated by discharger,
$V_m$ = RMS noise indicated by meter,
$V_r$ = residual RMS noise generated by amplifier.

It may be more informative to express the noise generated by the discharger in terms of decibels below the noise voltage produced by a 50 microampere discharge from a simulated airfoil trailing edge. To establish the latter figure a noise measurement is made with the trailing edge simulator 71 placed in the tester in the manner shown in FIG. 14. This simulator is made of 0.030 inch thick aluminum sheet and should protrude sufficiently far beyond the edge of portion 1″ of plate 44 that corona occurs from element 71 alone, but not far enough to appreciably distort the RF field within the tester. A one inch protrusion as indicated has proved satisfactory. To prevent corona discharge from the corners of the simulator, they should be rounded and covered with plastic tape 72 as illustrated.

We claim:

1. Apparatus for measuring the radio frequency noise produced by a static discharger for an aircraft, said apparatus comprising: an enclosure shielded for radio frequency radiation; a conductive plate having a straight edge within said enclosure simulating the trailing edge of an airfoil, said edge being normal to a reference axis lying in the plane of said plate; a noise output electrode having a conductive surface spaced from said edge, facing said edge, centered on said axis and symmetrical to said plane, said conductive surface conforming to an equipotential surface of the electric field that would exist at said output electrode were said plate electrically energized and were said edge long enough to insure absence of fringing effects at said output electrode; a plurality of conductive guard rings situated between said edge and the conductive surface of said output electrode, each guard ring being centered on said axis and symmetrical to said plane and bounding a surface conforming to an equipotential surface of said electric field; a high resistance potential divider connected between said output electrode and said plate and having said guard rings connected to intermediate points thereon; means for attaching a static discharger test sample to the said edge of said plate in substantial alignment with said axis; means for inducing a corona discharge of predetermined magnitude from said sample; and means for measuring the root-mean-square value of the radio frequency noise voltage between said output electrode and said plate.

2. Apparatus as claimed in claim 1 in which said means for inducing corona discharge from said sample comprises a direct current electrode in the form of a paraboloid of thin dielectric material having a uniform coating of a high resistance material on its inner surface; means supporting said direct current electrode concentrically of said axis with its open end facing said sample and providing for axial adjustment of the electrode's position relative to said test sample; a high resistance direct current lead connected at one end to said resistive coating at the apex of said paraboloid; and a source of adjustable high direct voltage connected between the other end of said lead and said plate.

3. Apparatus as claimed in claim 2 in which said means for measuring the noise voltage comprises a wide band radio frequency amplifier having its input connected between said output electrode and said plate; an alternating current voltmeter designed to measure the root-mean-square value of an alternating voltage; and a bandpass filter coupled between the output of said amplifier and said voltmeter for applying to said voltmeter only those noise voltages lying within a predetermined band of radio frequencies.

No references cited.

KATHLEEN H. CLAFFY, *Primary Examiner.*

R. S. BELL, *Assistant Examiner.*